United States Patent
Isoshima et al.

(10) Patent No.: US 7,640,558 B2
(45) Date of Patent: Dec. 29, 2009

(54) OPTICAL DISC DRIVE

(75) Inventors: Nobuyuki Isoshima, Hitachinaka (JP);
Takayuki Fujimoto, Tsuchiura (JP);
Yoshiaki Yamauchi, Omitama (JP);
Seiichi Katou, Tsuchiura (JP); Ikuo Nishida, Ebina (JP); Youichi Narui, Matsudo (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 513 days.

(21) Appl. No.: 11/668,032

(22) Filed: Jan. 29, 2007

(65) Prior Publication Data
US 2007/0277185 A1 Nov. 29, 2007

(30) Foreign Application Priority Data
May 29, 2006 (JP) ............................... 2006-147569

(51) Int. Cl.
*G11B 17/03* (2006.01)
(52) U.S. Cl. ..................................... 720/648
(58) Field of Classification Search ................ 720/648, 720/601, 659, 673
See application file for complete search history.

(56) References Cited

U.S. PATENT DOCUMENTS

| | | | | |
|---|---|---|---|---|
| 5,086,422 | A | * | 2/1992 | Hagiya et al. ............... 720/648 |
| 7,454,769 | B2 | * | 11/2008 | Ochi et al. .................. 720/673 |
| 2004/0062175 | A1 | * | 4/2004 | Inoue ........................ 369/77.2 |
| 2005/0086677 | A1 | * | 4/2005 | Ochi et al. .................. 720/659 |
| 2006/0259919 | A1 | * | 11/2006 | Funawatari et al. ......... 720/741 |
| 2006/0294535 | A1 | * | 12/2006 | Funawatari et al. ......... 720/734 |
| 2007/0079312 | A1 | * | 4/2007 | Isoshima et al. ............ 720/648 |

FOREIGN PATENT DOCUMENTS

JP 2004-241024 8/2004

* cited by examiner

*Primary Examiner*—Allen T Cao
(74) *Attorney, Agent, or Firm*—Antonelli, Terry, Stout & Kraus, LLP.

(57) ABSTRACT

Increases in the data transfer rates of optical disc drives have resulted in problems such as increases in optical disc vibrations due to higher rotation speeds or increases in heat generation due to increases in the output of motors for rotating the optical discs and in the output of laser diodes. To solve such problems, an optical pickup is provided with an air duct therein, and a space that is formed between the optical disc and a top case of a casing and that has negative pressure during rotation of the optical disc is connected to the air duct in the optical pickup via a tube, at least part of the tube being deformable. The optical pickup is cooled by the air flow through the air duct induced by pressure difference.

7 Claims, 12 Drawing Sheets

OPTICAL DISC DRIVE

FIELD OF THE INVENTION

The present invention relates to an optical disc drive for recording or reading information on a recording medium on which information is optically recorded.

BACKGROUND ART

Increases in the data transfer rates of optical disc drives have resulted in problems such as increases in optical disc vibrations due to higher rotation speeds or increases in heat generation due to increases in the output of motors for rotating optical discs and in the output of laser diodes.

For example, JP Patent Publication (Kokai) No. 2004-241024 A (to be hereinafter referred to as "Patent Document 1") discloses an optical disc drive aimed at solving problems associated with such increases in data transfer rates. According to the invention disclosed in Patent Document 1, an opening is provided in a top case, and air is introduced into a casing by utilizing the negative pressure generated on the upper side of the disc when an optical disc is rotating, so as to perform cooling. See JP Patent Publication (Kokai) No. 2004-241024 A

SUMMARY OF THE INVENTION

Laser beam source output tends to be increasing along with increases each year in the data transfer rates of optical disc drives. Thus, it is necessary to further suppress the temperature increase of optical pickups or to facilitate radiation of heat generated by disc rotation motors to the outside of casings.

Further, based on the structure of Patent Document 1, since sound noise generated as the optical disc is rotating is transmitted to the outside via the opening, such sound noise needs to be minimized, which is a problem associated with Patent Document 1.

Thus, the present invention provides an optical disc drive that increases radiation of heat from the optical pickup without an increase in sound noise and facilitates radiation of heat generated by the disc rotation motor to the outside of the casing.

In order to solve the above problems, the optical disc drive of the present invention includes a casing main body; a top case and a bottom case that sandwich the casing main body; a disc transfer member for transferring the optical disc from the inside of the casing main body to the outside; an optical pickup that is disposed toward the bottom case in the casing main body and that includes one or a plurality of laser diodes that emit a laser beam for recording or reading information on the optical disc and an air duct therein; and a tube having one end thereof located in a space between the optical disc and the top case and the other end thereof connected to the air duct in the optical pickup.

In accordance with the present invention, heat from the optical pickup or the disc rotation motor can be directly transferred with air flow through the tube generated due to pressure difference caused by negative pressure created between the optical disc and the top case during the rotation of the optical disc. Further, the heat transferred can be radiated to the outside of the optical disc drive through the top case by connecting the tube to the top case. By using a flexible tube with one part thereof made of deformable material, it becomes possible to accommodate the movement of the optical pickup when information is recorded or read, or the movement of the disc rotation motor when the optical disc is ejected or inserted.

DESCRIPTION OF PREFERRED EMBODIMENTS OF THE INVENTION

Embodiments of the present invention will be described hereafter with reference to the drawings.

Embodiment 1

Figure 1:
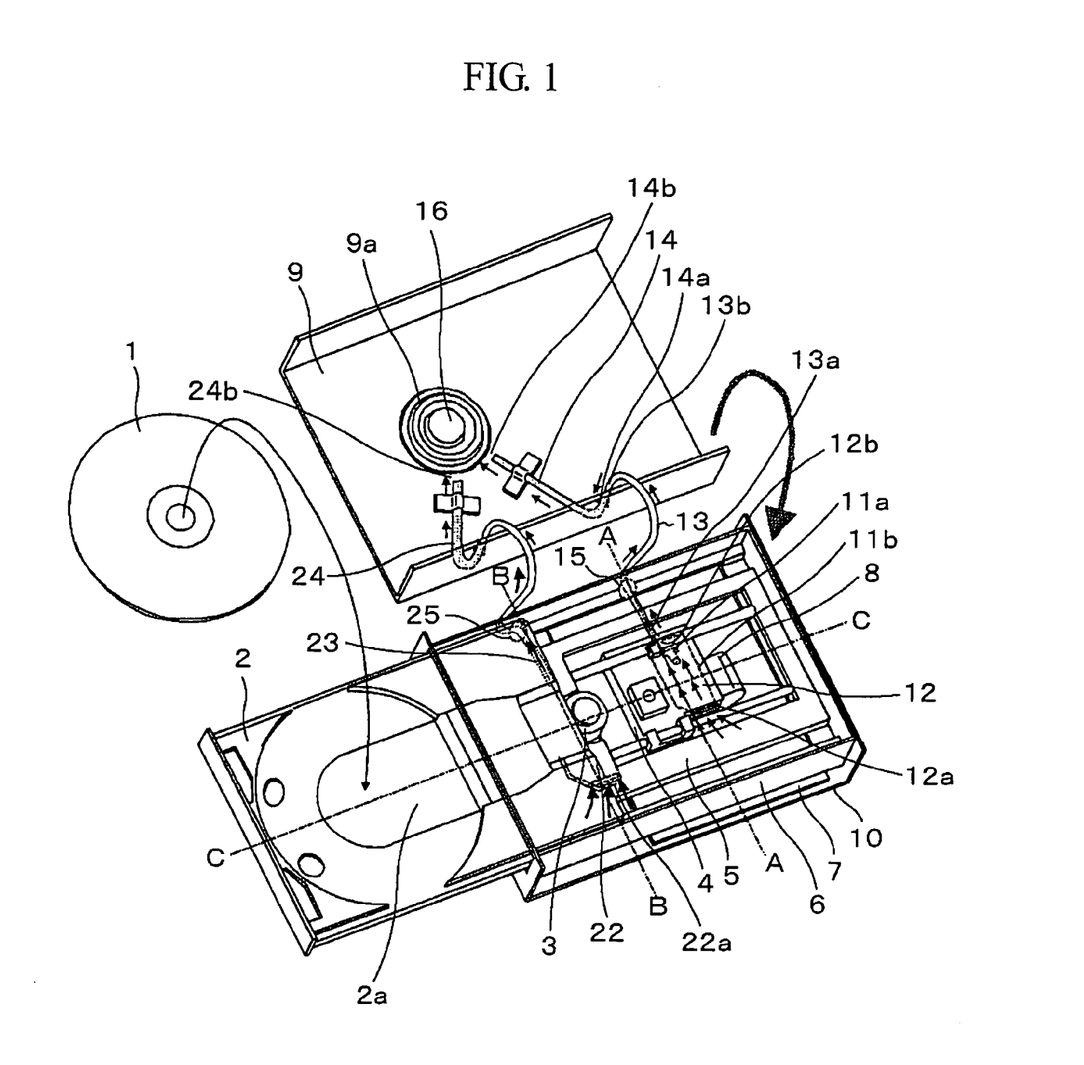
FIG. 1 shows an embodiment of an optical disc drive of the present invention.
Figure 2:
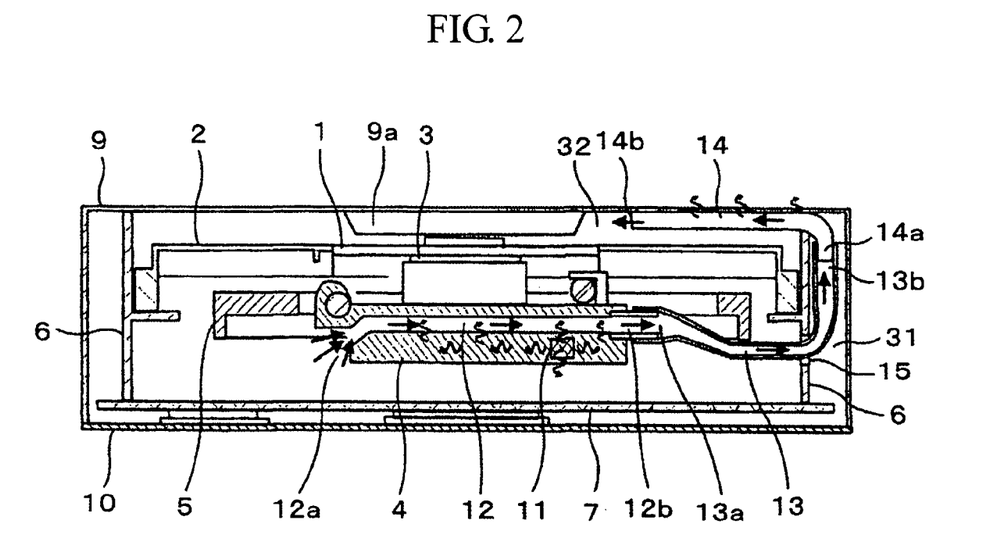
FIG. 2 shows an embodiment of the optical disc drive of the present invention.
Figure 3:
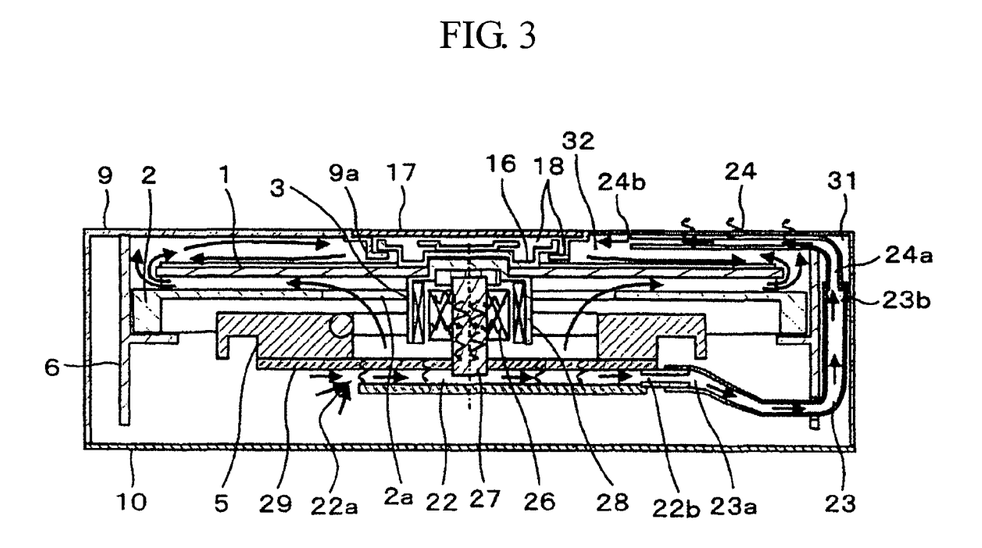
FIG. 3 shows an embodiment of the optical disc drive of the present invention.
Figure 4:
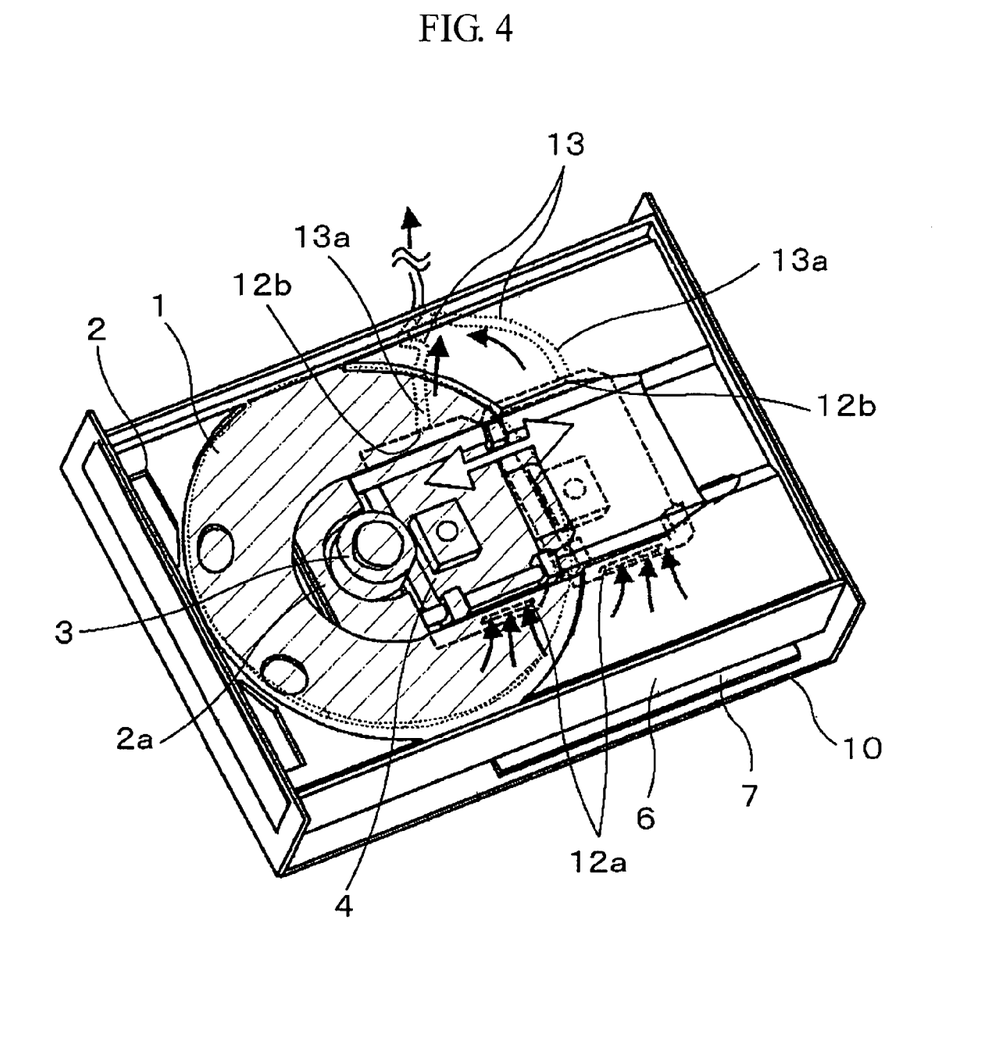
FIG. 4 shows an embodiment of the optical disc drive of the present invention.
Figure 5:
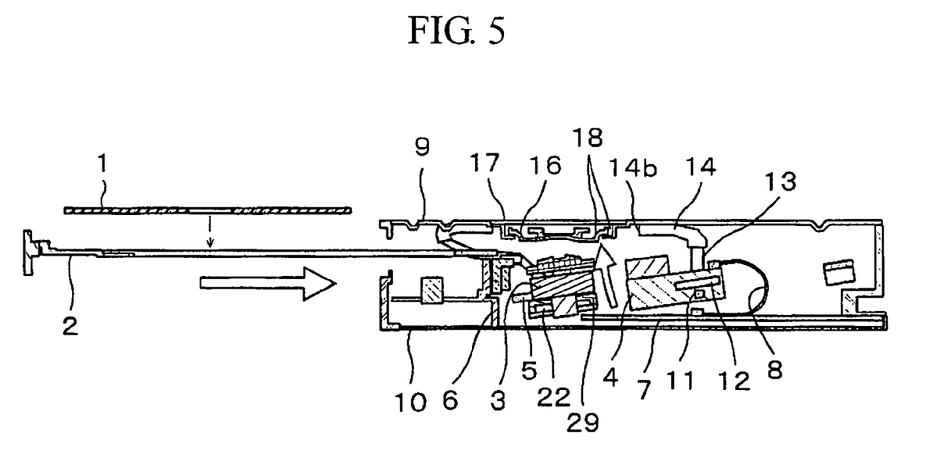
FIG. 5 shows an embodiment of the optical disc drive of the present invention.
Figure 6:
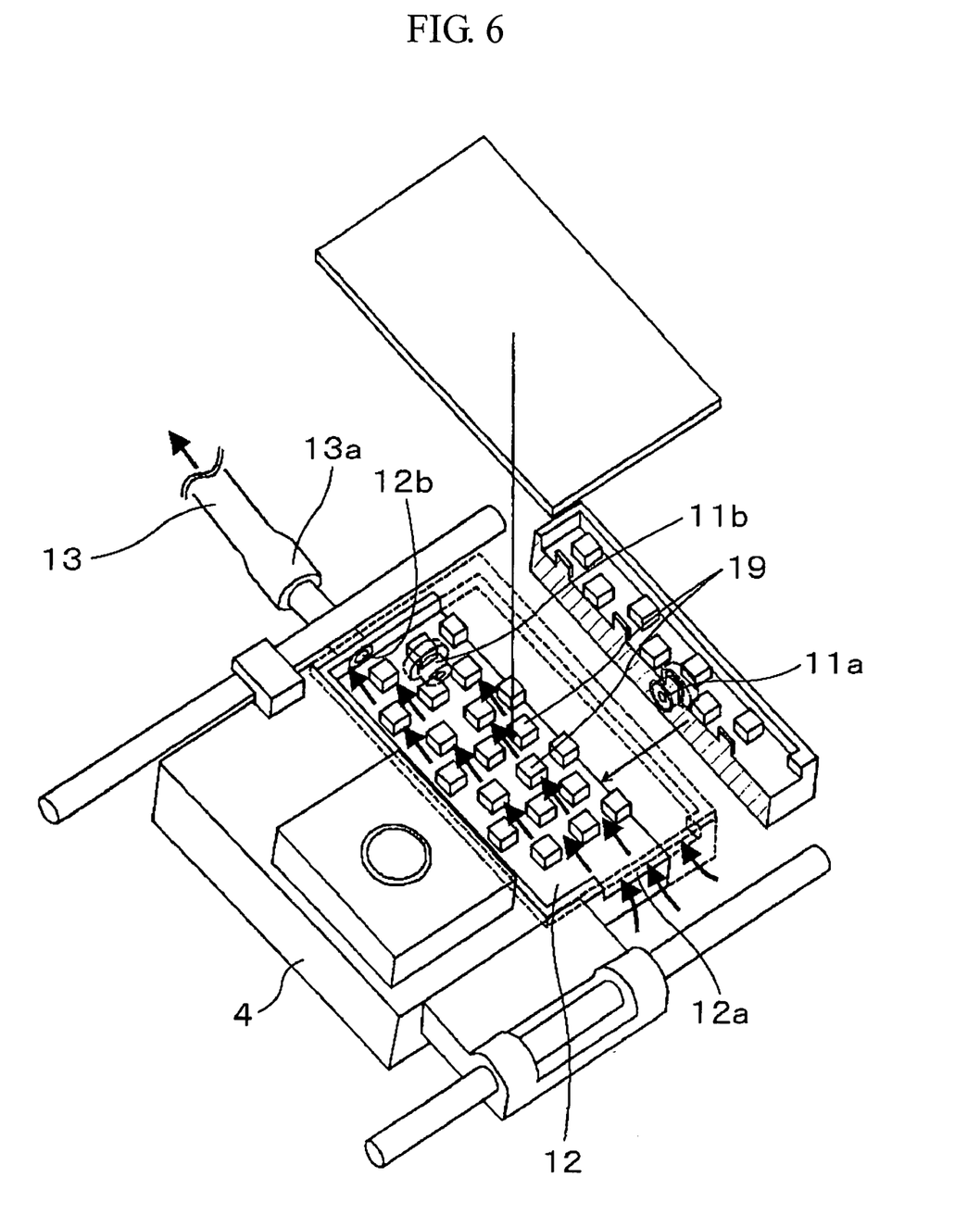
FIG. 6 shows an embodiment of the optical disc drive of the present invention.
Figure 7:
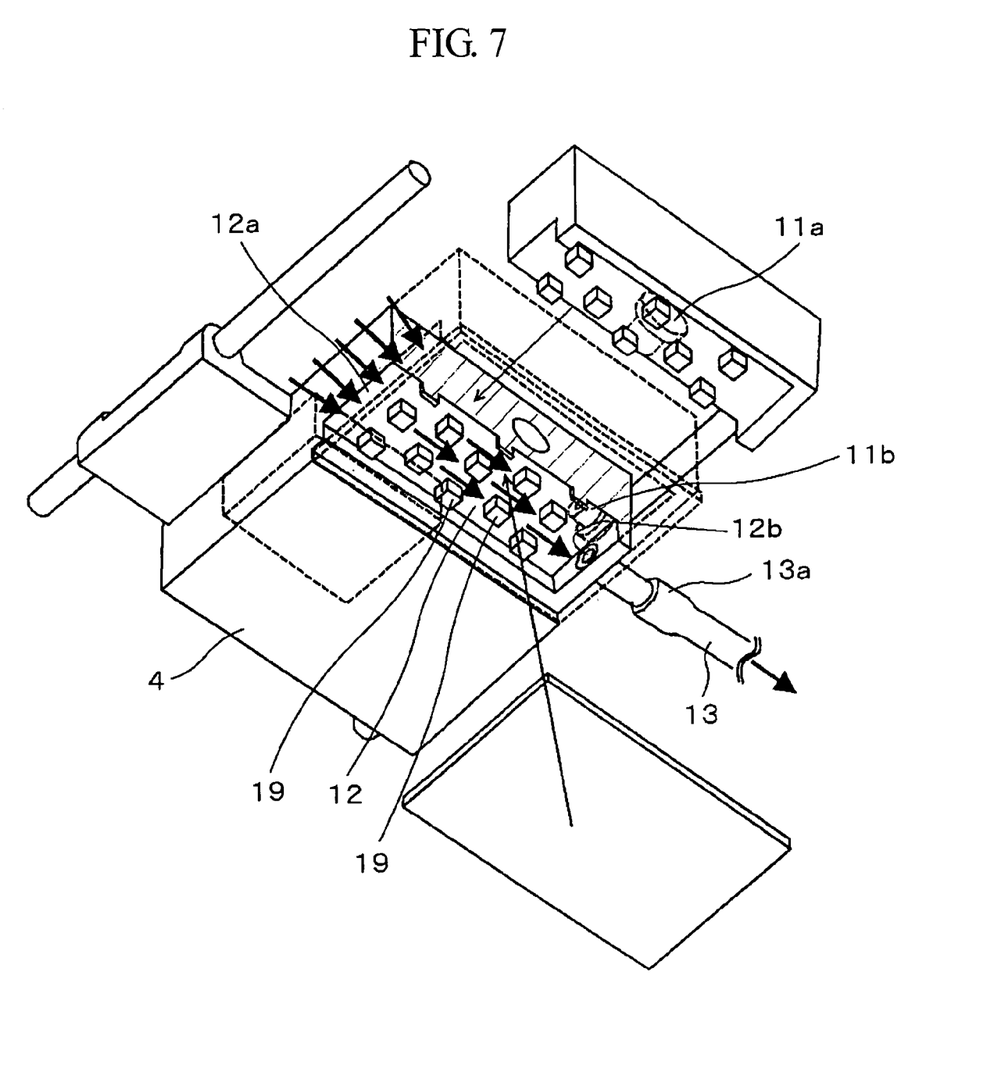
FIG. 7 shows an embodiment of the optical disc drive of the present invention.
Figure 8:
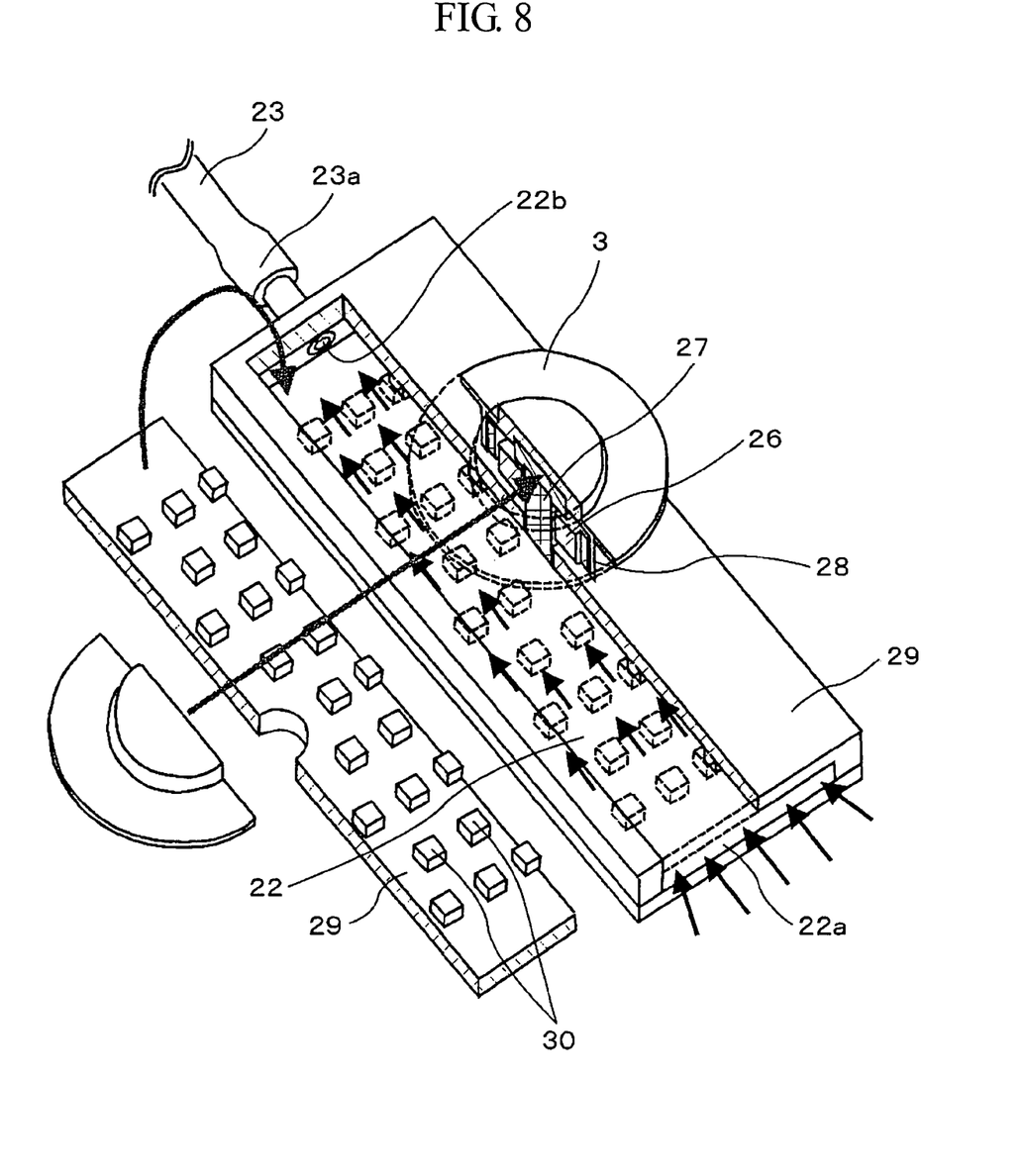
FIG. 8 shows an embodiment of the optical disc drive of the present invention.
Figure 9:
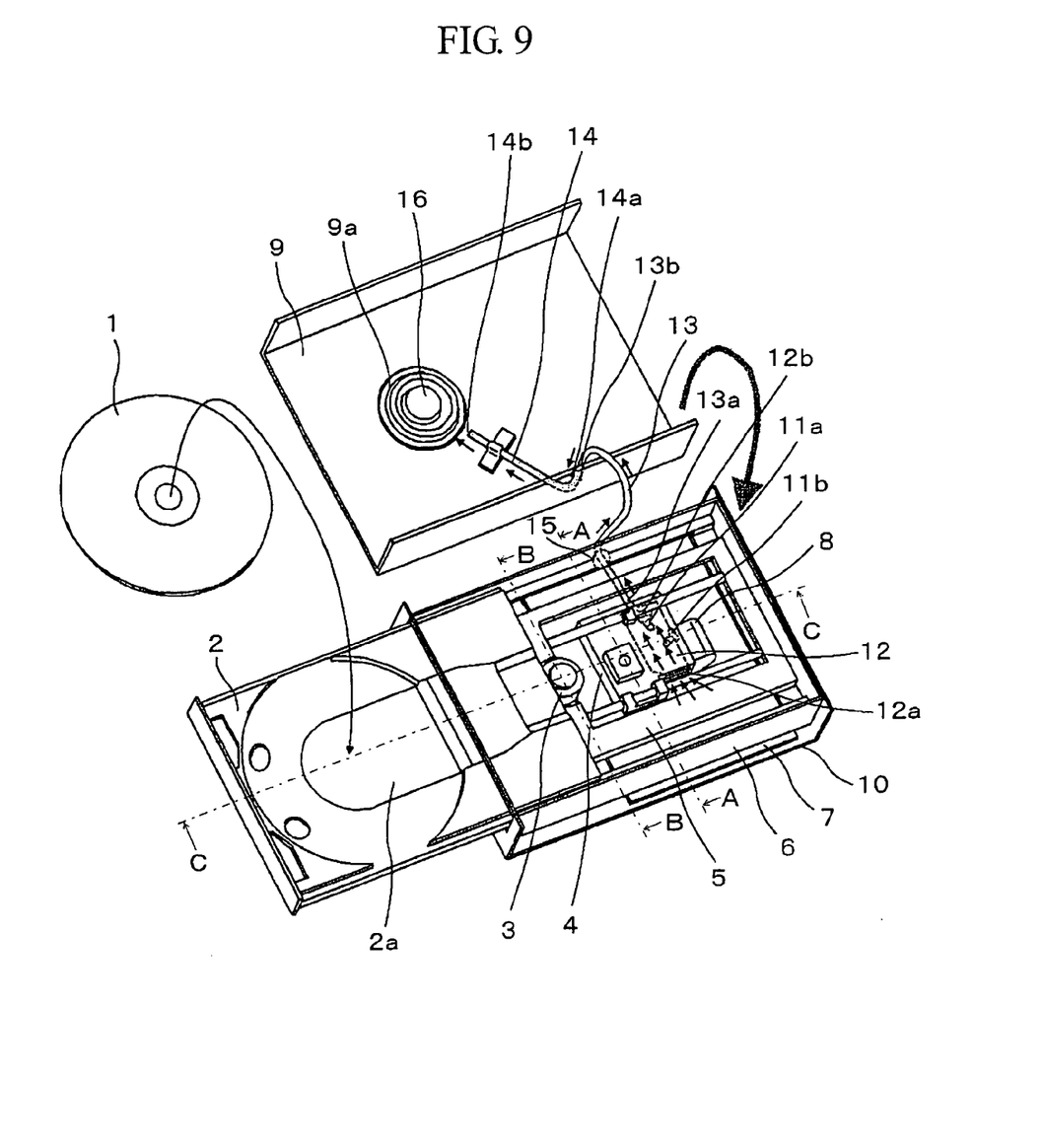
FIG. 9 shows an embodiment of the optical disc drive of the present invention.

FIGS. 1 to 9 show explanatory diagrams of a first embodiment of the present invention. FIG. 1 shows an exploded diagram of a main part of an optical disc drive as the first embodiment of the present invention. FIG. 2 shows a cross-sectional view taken along line A-A in FIG. 1. FIG. 3 shows a cross-sectional view taken along line B-B in FIG. 1. FIG. 4 shows a state in which the optical disc drive in FIG. 1 is being operated. FIG. 5 shows a cross-sectional view taken along line C-C in FIG. 1. FIGS. 6 and 7 show examples of the structure of an air duct in an optical pickup. FIG. 8 shows an example of the structure of a disc rotation motor-fixing-part air duct. FIG. 9 shows a structural example in which an optical pickup portion is provided with tubes.

In FIGS. 1 to 9, reference numeral 1 denotes an optical disc; 2 denotes a disc transfer member for transferring the optical disc 1; 2a denotes a penetrating hole in the disc transfer member 2; 3 denotes a disc rotation motor for rotating the optical disc 1; 4 denotes an optical pickup; 5 denotes a unit mechanism including the optical pickup 4 and the disc rotation motor 3; 6 denotes a casing main body; 7 denotes a control board; 8 denotes a cable connecting the optical pickup 4 with the control board 7; 9 denotes a top case; 9a denotes a depressed portion having an opening in the top case 9; 10 denotes a bottom case; 11a and 11b denote laser diodes incorporated in the optical pickup 4; 12 denotes an air duct in the optical pickup 4; 12a denotes an entrance of the air duct 12;

12b denotes an exit of the air duct 12; 13 denotes a deformable tube; 13a denotes an entrance of the tube 13; 13b denotes an exit of the tube 13; 14 denotes a fixed tube; 14a denotes an entrance of the tube 14; 14b denotes an exit of the tube 14; 15 denotes a penetrating hole or a notched part in the casing main body 6; 16 denotes a clamp housed on the inner side of the depressed portion 9a of the top case 9; 17 denotes a clamp cover; 18 denotes a space surrounded by the clamp 16 and the clamp cover 17 on the inner side of the depressed portion 9a having an opening in the bottom surface of the top case; 19 denotes columnar structures disposed in the air duct 12; 20 denotes depressions disposed on the surface of the top case 9 above the optical disc 1 so that the depressions protrude toward the optical disc 1; 21 denotes a label seal; 22 denotes a disc rotation motor-fixing-part air duct with which the disc rotation motor fixing part 29 is provided; 22a denotes an entrance of the disc rotation motor-fixing-part air duct 22; 22b denotes an exit of the disc rotation motor-fixing-part air duct 22; 23 denotes a deformable tube; 23a denotes an entrance of the tube 23; 23b denotes an exit of the tube 23; 24 is a fixed tube; 24a denotes an entrance of the tube 24; 24b denotes an exit of the tube 24; 25 denotes a penetrating hole or a notched part in the casing main body; 26 denotes a coil of the disc rotation motor 3; 27 denotes a shaft of the disc rotation motor 3; 28 denotes a rotor of the disc rotation motor 3; 29 denotes a fixing part for fixing the disc rotation motor 3 to the unit mechanism 5; 30 denotes columnar structures disposed in the disc rotation motor-fixing-part air duct; 31 denotes a space formed between the top case 9 and a side surface of the casing main body 6; and 32 denotes a space formed between the upper side of the optical disc 1 and the top case 9. Parts having identical functions will be hereafter denoted by identical reference numerals, and the descriptions thereof will be omitted.

The side of the disc transfer member 2 shown on the left side of FIG. 1 protruding from the main body of the disc drive to the outside corresponds to the front side of the optical disc drive, and generally, the disc drive is incorporated in or externally attached to information-processing equipment such as a PC (Personal Computer) with this side as the front side. For convenience of explanation, the vertical direction will be hereinafter defined such that the direction of the position of the mounted optical disc 1 is the top with respect to the disc transfer member 2. Examples of the optical disc 1 on which the optical disc drive executes recording or reading include a CD (Compact Disc), CD-R (Recordable), CD-RW (ReWritable), DVD (Digital Versatile Disc), DVD-R, DVD-RAM (Random Access Memory), and DVD-RW, and such a disc is inserted into the optical disc drive without use of a cartridge. By pressing an eject button (not shown) or the like when the optical disc 1 is placed in the disc transfer member 2, the disc transfer member 2 slides and moves into the casing of the optical disc drive, and thus, the optical disc 1 is inserted into the drive. At this point, the unit mechanism 5 including the optical pickup 4 and the disc rotation motor 3 is tilted and moved in the upward direction, and the disc rotation motor 3 engages the inner periphery of the optical disc 1. Further, the clamp 16 housed in the space 18 between the depressed portion 9a having an opening in the bottom surface of the top case 9 and the clamp cover 17 engages the disc rotation motor 3 through the opening of the depressed portion 9a due to the effect of a magnet incorporated in the upper part of the disc rotation motor 3, and therefore the optical disc 1 is fixed by being vertically sandwiched. When the optical disc 1 is rotated by the disc rotation motor 3 in a clockwise direction, the clamp 16 engaged with the disc rotation motor 3 is also rotated. The disc rotation motor 3 is fixed to the fixing part 29, and the fixing part 29 is fixed to the front side of the unit mechanism 5. The unit mechanism 5 is structured such that it can be tilted and moved, and it is fixed to the casing main body 6.

The optical pickup 4 supported by the unit mechanism 5 can move forward or backward relative to the optical disc drive; that is, radially with respect to the optical disc 1. The optical pick up 4 moves radially with respect to the disc based on an operation signal from the control board 7, and a desired position on the recording surface, which is the lower side of the optical disc 1, is irradiated with a laser, whereby information is recorded or read.

The optical pickup shown in FIG. 1 includes the laser diodes 11a and 11b. The wavelength of a CD laser for recording/reading information thereon is 785 nm, which is different from the 660 nm wavelength of a DVD laser. As in the present embodiment, the optical disc drive capable of recording and reading information on both DVDs and CDs has two laser diodes. However, in the case of Blu-ray or the like for which a blue-violet laser (with a wavelength of 405 nm) is used, since another laser diode is mounted on the optical pickup 4, the number of laser diodes is not limited to two; one laser diode or three or more diodes may be used.

Based on the above structure, as shown in FIG. 3, which is a cross-sectional view taken along line B-B in FIG. 1, when the optical disc drive performs recording or reading, shearing force, centrifugal force, or the like is generated in the air around the optical disc 1 due to the rotation of the optical disc 1, whereby air flow is created. On the lower side of the optical disc 1, air is sucked from the lower side of the disc transfer member 2 through the penetrating hole 2a around the disc rotation motor 3, and the air flows from the inner periphery to the outer periphery between the optical disc 1 and the disc transfer member 2 due to the centrifugal force created by the rotation of the optical disc 1. Some of the air flows to the outside from the disc transfer member 2, and some of the air rolls up to the upper side of the optical disc 1 and flows toward the inner periphery of the optical disc 1.

Meanwhile, near the upper side of the optical disc 1, air flows from the inner periphery to the outer periphery of the optical disc 1 due to the centrifugal force created by the rotation of the optical disc 1, and some of the air flows to the outside from the upper side of the optical disc 1. Unlike the lower side of the optical disc 1, since there is no path into which air can flow from the center portion of rotation, such as the penetrating hole 2a, pressure distribution in which pressure is decreased around the center portion is formed on the upper side of the optical disc 1. Thus, since circulating air flow whereby the air flows back from the outer periphery to the inner periphery of the optical disc 1 is created near the top case 9, the air flow rolling up from the lower side to the upper side of the optical disc 1 is created at the outer circumferential end of the optical disc 1, as described above.

Since the clamp 16 rotates along with the optical disc 1 within the space 18 surrounded by the depressed portion 9a having an opening in the bottom surface of the top case 9 and the clamp cover 17, the pressure around the clamp 16 on the upper side of the optical disc 1 is particularly decreased. For example, when the rotation speed is 9000 revolutions per minute, while the pressure on the upper side of the optical disc 1 is about −40 Pa, the pressure in the space 18 is about −80 Pa.

In the present embodiment, as shown in FIG. 1, by installing the air duct 12 in the optical pickup 4 and connecting the air duct exit 12b with the space 32 between the upper side of the optical disc 1 and the top case 9 via the tubes 13 and 14, the pressure at the exit 14b of the tube 14 is caused to be negative with respect to that at the entrance 12a of the air duct 12 in the optical pickup. As a result, such air flow from the optical pickup 4 to the upper side of the optical disc 1 is induced.

When information on the optical disc 1 is recorded or read, the laser diodes 11a and 11b in the optical pickup 4 emit laser beam, and the optical disc 1 is irradiated with the laser beam generated. However, due to such light emission, the laser diodes 11a and 11b generate heat and the temperature thereof is increased. The heat of the laser diodes 11a and 11b is maintained at a temperature that does not cause deterioration of the laser diodes 11a and 11b as the heat is radiated through the optical pickup 4. In a general optical disc drive, the optical pickup 4 is mainly cooled by the convective heat transfer that occurs when the air flow in the casing main body 6 induced by the rotation of the optical disc 1 passes over the surface of the optical pickup 4. However, based on the above structure of the present invention, it is possible to internally cool the optical pickup 4 and the laser diodes 11a and 11b.

In the present embodiment, the tube 13 is a deformable, flexible tube, such as a vinyl tube. FIG. 4 shows movement of the optical pickup 4 radially with respect to the optical disc 1. In the figure, the position of the optical pickup 4 when located under the innermost periphery part of the optical disc 1 is shown by a solid line, and the position of the optical pickup 4 when located under the outermost periphery part of the optical disc 1 is shown by a broken line. Since the tube 13 is deformable, when the optical pickup 4 moves forward or backward, the optical pickup 4 can be smoothly moved as the tube 13 is deformed.

FIG. 5 shows a state in which the unit mechanism 5 including the optical pickup 4 and the disc rotation motor 3 has been tilted and moved downward and the disc transfer member 2 has been moved forward during insertion or ejection of the optical disc 1. Since the tube 13 is deformable, in cases in which optical pickup 4 is moved in the vertical direction when the optical disc 1 is inserted or ejected, the optical pickup 4 can be smoothly moved as the tube 13 is deformed.

Further, as shown in FIG. 1, the tube 14 is a tube made of material having high thermal conductivity, such as a copper tube or an aluminum tube, and the tube 14 is connected to top case 9, so that they are in direct contact with each other. In this way, the heat conducted from the optical pickup 4 is transferred to the top case 9 due to thermal conduction as the heat passes through the tube 14, and thus, the heat can be radiated from the outer surface of the top case 9 to the outside of the optical disc drive.

Since the air flow sucked from the optical pickup 4 is released from the exit 14b of the tube 14 to the upper side portion of the optical disc 1, the pressure on the upper side of the optical disc 1, which has been a negative-pressure region, is somewhat increased, and the pressure difference between the upper side and the lower side of the optical disc 1 is therefore reduced. Thus, it is possible to obtain advantageous effects of reducing thrust force in the upward direction of the shaft of the disc rotation motor 3 and reducing vibration of the optical disc 1.

In FIG. 1, the deformable tube 13 is first introduced into the space 31 formed between a side surface of the top case 9 and an outer side surface of the casing main body 6 through the penetrating hole or notched part 15 in the side surface of the casing main body 6, and the deformable tube 13 is then connected to the fixed tube 14. In this way, since play of the tube 13 is housed in the space 31 when the tube 13 is deformed or moved along with movement of the optical pickup 4, it is possible to prevent the tube 13 from coming into contact with or interfering with surrounding moving parts, such as the disc transfer member 2. Further, as shown in FIG. 4, a connecting port (the exit 12b of the air duct 12) where the air duct 12 in the optical pickup and the tube 13 are connected is located in a direction substantially perpendicular to the moving direction of the optical pickup 4. Since the moving direction of the optical pickup 4 is substantially perpendicular to the direction in which the tube 13 and the optical pickup 4 are connected, it is possible to significantly reduce the force by which the tube 13 is detached upon movement of the optical pickup 4.

FIG. 6 shows an example of a specific structure of the air duct 12 in the optical pickup. FIG. 6 shows a perspective view of the optical pickup 4 of the optical disc drive shown in FIG. 1, in which a main part of the optical pickup 4 is separated into parts. The air duct 12 in the optical pickup is disposed in an upper portion of the optical pickup 4; that is, in a portion above the laser diodes 11a and 11b. The air duct 12 in the optical pickup may be provided with a plurality of columnar structures 19. Heat generated by heat-generating components, such as the laser diodes 11a and 11b, is transferred through the optical pickup 4 via thermal conduction to the surface of the air duct 12 in the optical pickup, and the heat is moved with the air flow in the air duct 12 via convective heat transfer, whereby the optical pickup 4 is cooled. Needless to say, there is also a path that directly transfers the heat to the surface of the optical pickup 4 via thermal conduction, and the heat is then radiated via convective heat transfer with the air flow around the optical pickup 4. In cases in which the air duct 12 in the optical pickup is provided with the columnar structures 19, the area of heat transfer is increased, and therefore, the amount of heat radiated from the optical pickup 4 can be increased. While individual columnar structures 19 are each in the shape of a square column in FIG. 6, they may alternatively each be in the shape of a cylindrical column or a thin fin, for example.

Furthermore, the air duct exit 12b in the optical pickup is disposed near where the laser diode 11b is disposed in the optical pickup 4, and the entrance 12a is disposed opposite thereto, resulting in such temperature distribution that the surface temperature of the air duct 12 in the optical pickup is gradually increased from the entrance side toward the exit side, due to heat transfer characteristics of the thermal conduction in the optical pickup 4. Meanwhile, the air flowing into the air duct entrance 12a in the optical pickup is heated as it flows toward the exit 12b, resulting in such temperature distribution that the air temperature is increased toward the exit 12b. Thus, based on the above configuration of the entrance 12a and the exit 12b, the logarithmic mean temperature difference in the air duct 12 in the optical pickup can be increased, and the amount of heat radiated from the optical pickup 4 can therefore be increased.

FIG. 7 shows another example of the structure of the duct 12 in the optical pickup, and it shows an oblique rear view of the separated main part of the optical pickup 4 of the optical disc drive shown in FIG. 1 seen from below. In this structural example, the air duct 12 in the optical pickup is disposed in a lower portion of the optical pickup 4; that is, in a portion below the laser diodes 11a and 11b. Heat generated by heat-generating components, such as the laser diodes 11a and 11b, is transferred downward through the optical pickup 4 via thermal conduction to the surface of the air duct 12 in the optical pickup, and the heat is moved along with the air flow in the air duct 12 via convective heat transfer, whereby the optical pickup 4 is cooled. At the same time, the heat is also transferred to the surface of the optical pickup 4 in the upward direction of the optical pickup 4 via thermal conduction. Since air flowing at relatively high speed due to the rotation of the optical disc 1 passes over the upper side of the optical pickup 4, the convective heat transfer coefficient is increased, thereby providing an advantage whereby the amount of heat radiation becomes greater than that of the above-described structure. While the portion under the optical pickup 4 in which the air duct 12 in the optical pickup is disposed is a portion in which it is difficult to facilitate heat radiation due to low air flow speed, such installation of the air duct 12 in the optical pickup enables effective cooling of the laser diodes 11a and 11b from both the upper and lower sides thereof.

Next, a structure for cooling the disc rotation motor 3 will be described. As shown in FIG. 1, the fixing part 29 for the disc rotation motor 3 of the unit mechanism 5 is provided with the air duct 22, and the air duct exit 22b and the space 32 between the upper side of the optical disc 1 and the top case 9 are connected via the tubes 23 and 24. In this way, since the pressure at the exit 24b of the tube 24 becomes negative with respect to that at the entrance 22a of the disc rotation motor-fixing-part air duct 22, air flow is induced from the disc rotation motor fixing part 29 to the upper side of the optical disc 1.

While high-speed rotation of the optical disc 1 is required when performing recording or reading information on the optical disc 1 at a high multiple speed, in such case, heat is generated from the coil 26 in the disc rotation motor 3 or the like shown in FIG. 3. There are cases in which such generated heat reaches a level of roughly dozens of times the heat generated by the laser diodes 11a and 11b, and the amount accounts for a large percentage of the total amount of the heat generated by the optical disc drive. The heat generated by the coil 26 is transferred to the fixing part 29 via the shaft 27 due to thermal conduction. In a conventional optical disc drive, such heat is diffused throughout the optical disc drive due to convective heat transfer through the surface of the coil 26 or the surface of the fixing part 29. However, in the present invention, since the air duct 22 is disposed below the fixing part 29 as shown in FIG. 3, heat can be directly removed from the disc rotation motor 3 with the air flowing through the air duct 22.

In the present embodiment, the tube 23 is a deformable, flexible tube, such as a vinyl tube, as in the case of the above tube connected to the optical pickup 4. FIG. 5 shows a state in which the unit mechanism 5 including the optical pickup 4 and the disc rotation motor 3 has been tilted and moved downward and the disc transfer member 2 has been moved forward during insertion or ejection of the optical disc 1. Since the tube 23 is deformable, when the disc rotation motor 3 is moved in the vertical direction upon insertion or ejection of the optical disc 1, the tube 23 does not interfere with the movement of the disc rotation motor 3 as the tube 23 is deformed.

Further, the tube 24 is a tube made of material having high thermal conductivity, such as a copper tube or an aluminum tube, and the tube 24 is directly connected to the top case 9, so that they are in direct contact with each other. In this way, the heat conducted from the disc rotation motor fixing part 29 is transferred to the top case 9 due to thermal conduction as it passes through the tube 24, and thus such heat can be efficiently radiated from the outer surface of the top case 9 to the outside of the optical disc drive.

Since the air flow sucked from the disc rotation motor fixing part 29 is released from the exit 24b of the tube 24 to the upper side portion of the optical disc 1, the pressure at the upper side of the optical disc 1, which has been a negative-pressure region, is somewhat increased, and the pressure difference between the upper side and the lower side of the optical disc 1 is therefore reduced. Thus, it is possible to obtain the advantageous effects of reducing thrust force in the upward direction of the shaft of the disc rotation motor 3 and reducing vibration of the optical disc 1.

In FIG. 1, the deformable tube 23 is first introduced into the space 31 formed between a side surface of the top case 9 and an outer side surface of the casing main body 6 through the penetrating hole or notched part 25 in a side surface of the casing main body 6, and the deformable tube 23 is then connected to the fixed tube 24. In this way, since play of the tube 23 is housed in the space 31 when the tube 23 is deformed or moved along with movement of the disc rotation motor 3, it is possible to prevent the tube 23 from coming into contact with or interfering with surrounding moving parts, such as the disc transfer member 2.

FIG. 8 shows a specific structural example of the disc rotation motor-fixing-part air duct 22. FIG. 8 shows a perspective view of the disc rotation motor-fixing-part air duct of the optical disc drive shown in FIG. 1, in which a main part of the disc rotation motor-fixing-part air duct is separated into parts. The disc rotation motor-fixing-part air duct 22 is disposed in a lower portion of the fixing part 29. The air duct 22 may be provided with a plurality of columnar structures 30. The heat generated by the coil 26 or the like is transferred to the surface of the disc rotation motor-fixing-part air duct 22 through the shaft 27 via thermal conduction, and it is then transferred with the air flow in the air duct 22 due to convective heat transfer, whereby the disc rotation motor 3 is cooled. Needless to say, there is also a path that allows the heat to be directly radiated throughout the optical disc drive due to the convective heat transfer with the surrounding air flow from the surface of the coil 26.

Since the disc rotation motor-fixing-part air duct 22 is provided with the columnar structures 30, the area of heat transfer is increased, and thus the amount of heat radiated from the disc rotation motor part 3 can be increased. While individual columnar structures 30 are each in the shape of a square column in FIG. 8, they may alternatively each be in the shape of a cylindrical column or a thin fin, for example.

Note that, while FIG. 1 shows a structural example in which both the optical pickup 4 and the disc rotation motor 3 are provided with tubes such as the tubes 13 and 23, the present invention is not limited to such example. For example, as shown in FIG. 9, the optical pickup 4 alone may be provided with the tubes 13 and 14, or the disc rotation motor-fixing-part 29 alone may be provided with the tubes 23 and 24 (not shown). This applies to the other embodiments described below.

Embodiment 2

Figure 10:
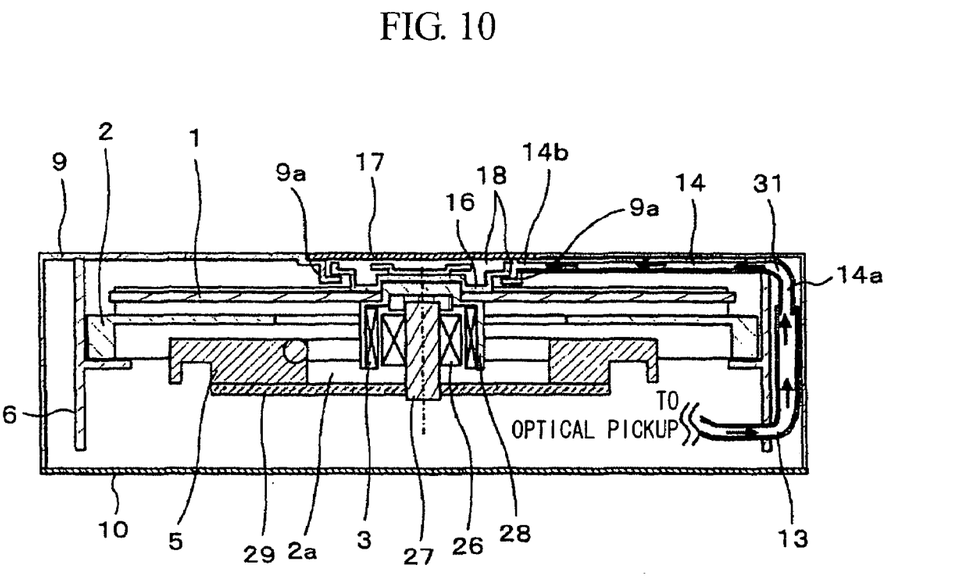
FIG. 10 shows another embodiment of the optical disc drive of the present invention.

FIG. 10 shows an explanatory diagram of a second embodiment of the present invention, and it shows a cross-sectional view taken along the same line as line B-B in FIG. 1.

In accordance with the second embodiment of the present invention, as shown in FIG. 10, the exit 14b of the tube 14 extending from the optical pickup 4 is connected to the space 18 surrounded by the clamp cover 17 and the clamp 16 in the depressed portion 9a of the top case. Since the space 18 is the region where pressure is reduced the most when the optical disc 1 is rotated, the differential pressure between the entrance of the tube 13 and the exit of the tube 14 is large. Thus, the quantity of air flowing through the tubes is increased, whereby the heat radiation characteristics of the optical pickup 4 can be improved.

The depressed portion 9a is a dent in the top case 9 opposite to the casing main body 6, and it has an opening in the bottom surface thereof. The clamp 16 is connected to the optical disc 1 through the opening and is rotated along with the optical disc 1. The clamp cover 17 covers the depressed portion 9a.

Further, in the second embodiment of the present invention, while not shown, the exit 24b of the tube 24 extending from the disc rotation motor 3 may be connected to the space 18 surrounded by the clamp cover 17 and the clamp 16 in the depressed portion 9a of the top case, as in the case of the tube connected to the optical pickup 4. Based on such structure, heat radiation from the disc rotation motor 3 can also be facilitated as in the case of the optical pickup 4.

Embodiment 3

Figure 11:
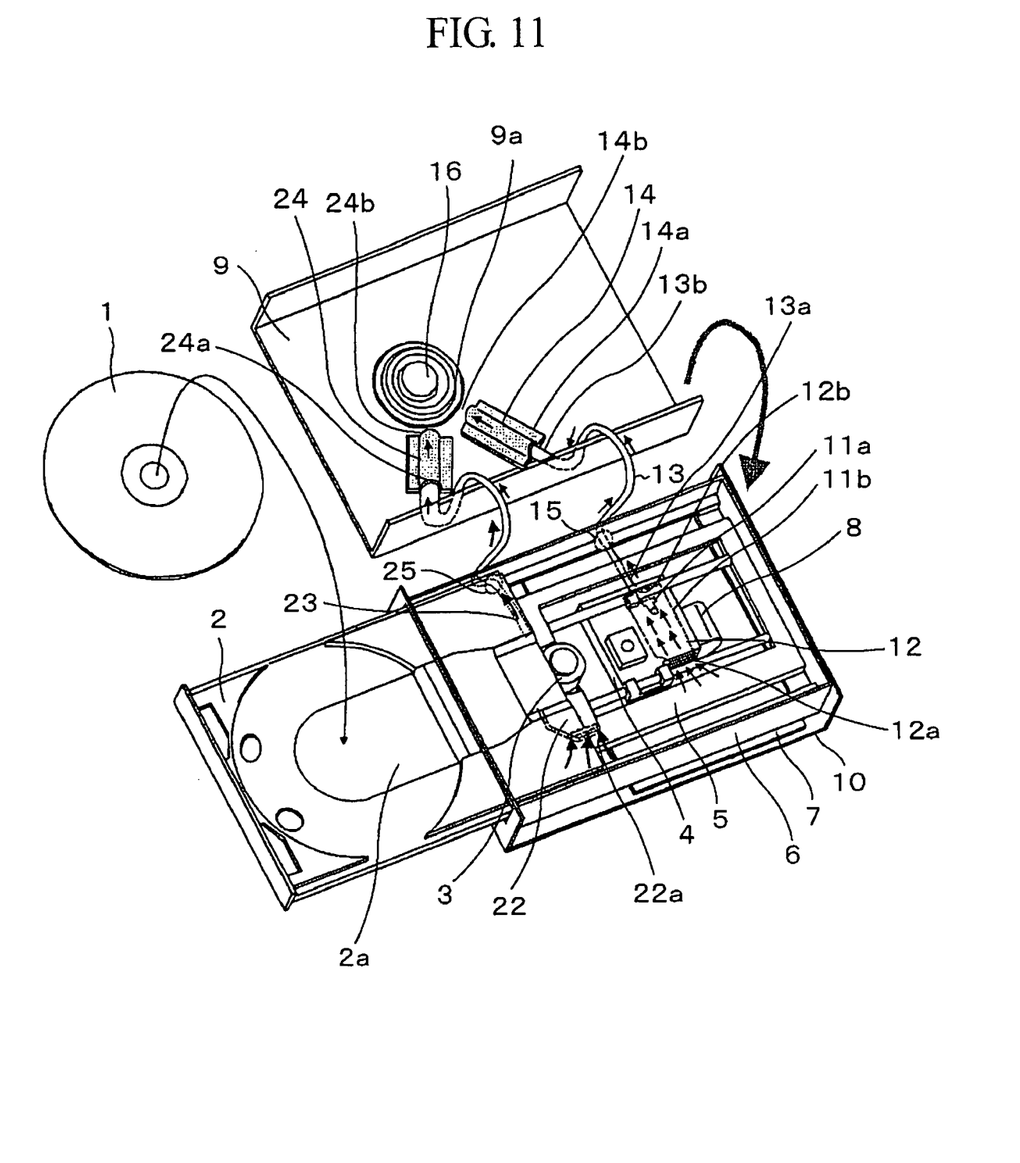
FIG. 11 shows another embodiment of the optical disc drive of the present invention.

FIG. 11 shows an explanatory diagram of a third embodiment of the present invention.

In the third embodiment of the present invention, regarding the tube 14 extending from the optical pickup 4, the top case 9 is used as part of the air duct, as shown in FIG. 11. With this structure, since part of the tube 14 comes into direct contact with the outside of the casing, the over-all coefficient of heat transmission is increased, thereby providing the advantage of increasing the amount of heat radiated to the outside of the optical disc drive when air flows through the tube 14.

Further, in the third embodiment of the present invention, regarding the tube 24 extending from the disc rotation motor 3, the top case 9 may be used as part of the air duct. With this structure, it is also possible to obtain the same effect on the disc rotation motor 3 as that on the optical pickup 4.

Embodiment 4

Figure 12:
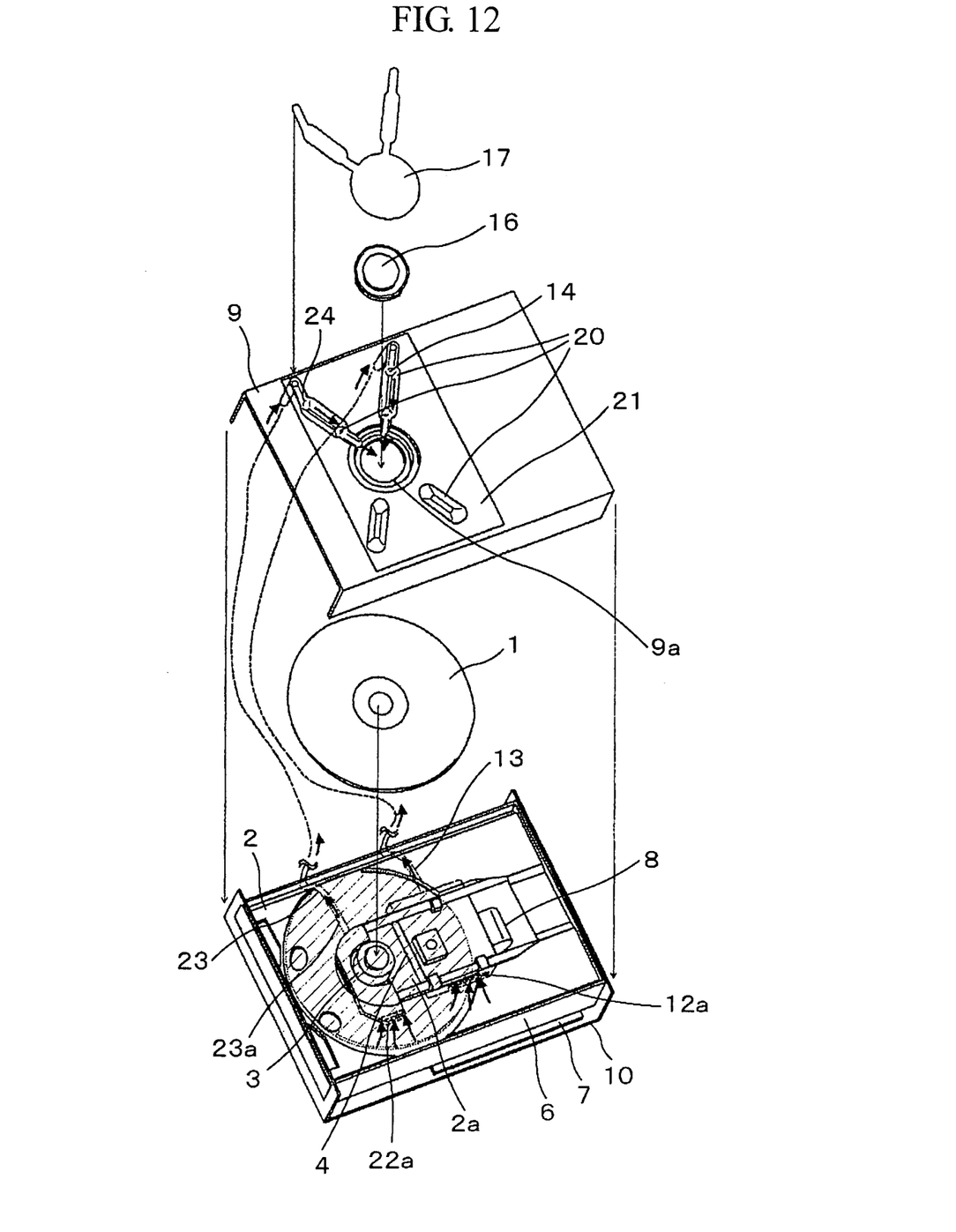
FIG. 12 shows another embodiment of the optical disc drive of the present invention.

FIG. 12 shows an explanatory diagram of a fourth embodiment of the present invention.

In the fourth embodiment of the present invention, as shown in FIG. 12, the tube 14 extending from the optical pickup 4 is structured as a space sandwiched between the top case 9 and extended portions of the clamp cover 17. The top case 9 is often provided with the depressions 20 protruding toward the optical disc 1, so as to suppress vibration caused by the rotation of the optical disc 1. Namely, the tube 14 can be formed by extending such depressions 20 radially with respect to the optical disc 1 and extending the clamp cover 17 along with the depressions 20 so that it covers the depressions 20.

Further, by affixing the label seal 21 providing information such as the type or the specifications of the optical disc drive on at least part of the surface where the top case 9 and clamp cover 17 are connected, it is possible to prevent rare cases in which the enlarged clamp cover 17 is accidentally peeled off attributable to the longer connection surface with the top case 9 when mounted within/connected to a personal computer or the like. Also, the attachment of such label seal can further assure the air-tightness of the tube 14. Since the label seal 21 that is made of an organic compound has higher emissivity than that of uncoated metal, the attachment of the label seal 21 facilitates thermal radiation to the outside of the optical disc drive, and thus the amount of heat radiated from the tube 14 can be increased.

In the fourth embodiment of the present invention, the tube 24 extending from the disc rotation motor 3 may be structured as a space sandwiched between the top case 9 and extended portions of the clamp cover 17, and the label seal 21 providing information such as the type or the specifications of the optical disc drive is affixed on at least part of the surface where the top case 9 and the clamp cover 17 are connected. With this structure, the heat radiation from the disc rotation motor 3 can also be facilitated, as in the case of the optical pickup 4.

Figure 13:
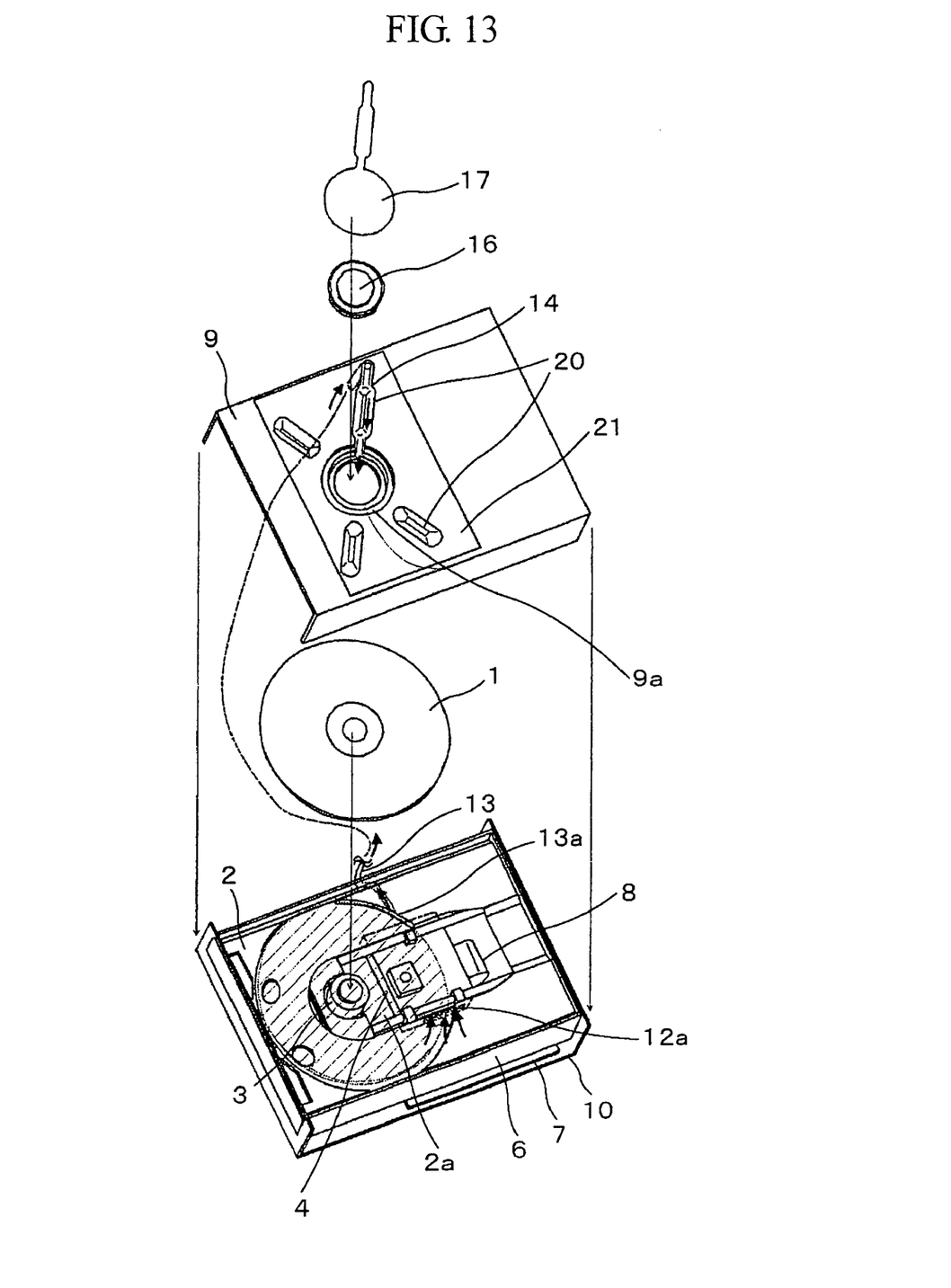
FIG. 13 shows another embodiment of the optical disc drive of the present invention.

Note that, while FIG. 12 shows a structural example in which the optical pickup 4 and the disc rotation motor 3 are provided with tubes such as the tubes 13 and 23, respectively, the present invention is not limited to such example. For example, as shown in FIG. 13, the optical disc drive may be provided with the tubes 13 and 14 alone extending from the optical pickup 4 or with the tubes 23 and 24 extending from the disc rotation motor-fixing part 29 (not shown).

The invention claimed is:

1. An optical disc drive, comprising:
   a casing main body;
   top and bottom cases sandwiching the casing main body;
   a disc transfer member for transferring an optical disc from the inside of the casing main body to the outside;
   an optical pickup that is disposed toward the bottom case in the casing main body and that includes one or a plurality of laser diodes that emit a laser beam for recording or reading information on an optical disc and an air duct therein; and
   a tube having one end thereof located within a space between the optical disc and the top case and the other end thereof connected to the air duct in the optical pickup.

2. The optical disc drive according to claim 1, wherein the top case comprises: a depressed portion that protrudes toward the casing main body and that has an opening in the bottom surface thereof: a clamp that is connected to the optical disc through the opening and that is rotated along with the optical disc; and a clamp cover that covers the depressed portion, and wherein one end of the tube is located within a space surrounded by the clamp cover and the clamp in the depressed portion.

3. The optical disc drive according to claim 1, wherein a side of the casing is provided with a penetrating hole or a notched part through which the tube passes, and a connecting port where the air duct in the optical pickup is connected to the tube is disposed substantially perpendicular to the direction in which the optical pickup is moved.

4. The optical disc drive according to claim 1, wherein the air duct is disposed above or below the laser diode.

5. An optical disc drive, comprising:
   an optical pickup;
   a casing main body;
   top and bottom cases sandwiching the casing main body;
   a disc transfer member for transferring an optical disc from the inside of the casing main body to the outside;
   a disc rotation motor that is disposed toward the bottom case in the casing main body and that rotates the optical disc;
   a unit mechanism that includes the disc rotation motor and the optical pickup and that is fixed to the casing main body;
   a fixing part that fixes the disc rotation motor to the unit mechanism and that is provided with an air duct; and
   a tube having one end thereof located within a space between the optical disc and the top case and the other end thereof connected to the air duct with which the fixing part that fixes the disc rotation motor is provided.

6. The optical disc drive according to claim 5, wherein the top case comprises: a depressed portion that protrudes toward the casing main body and that has an opening in the bottom surface thereof; a clamp that is connected to the optical disc through the opening and that is rotated along with the optical disc; and a clamp cover that covers the depressed portion, and wherein one end of the tube is located within a space surrounded by the clamp cover and the clamp in the depressed portion.

7. The optical disc drive according to claim 5, wherein the air duct is disposed below the fixing part.

* * * * *